J. W. WALKER.
APPARATUS FOR MIXING OR IMPREGNATING ONE LIQUID WITH ANOTHER.
APPLICATION FILED JULY 30, 1918.
1,296,241.
Patented Mar. 4, 1919.
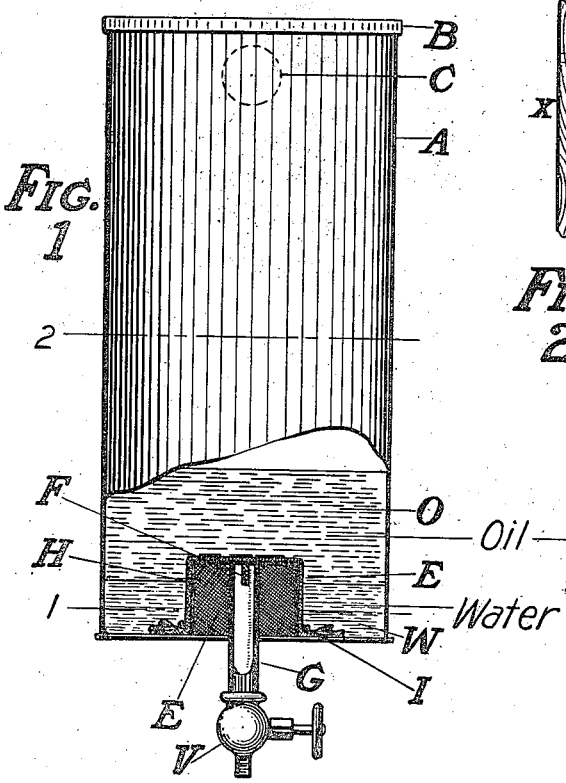
FIG. 1
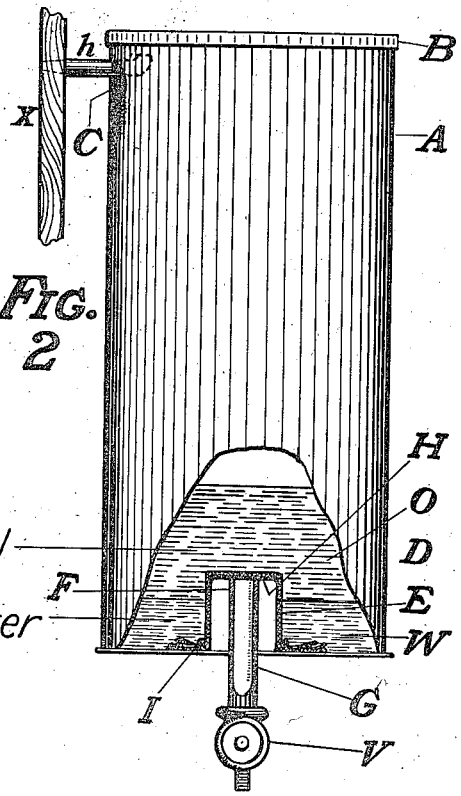
FIG. 2
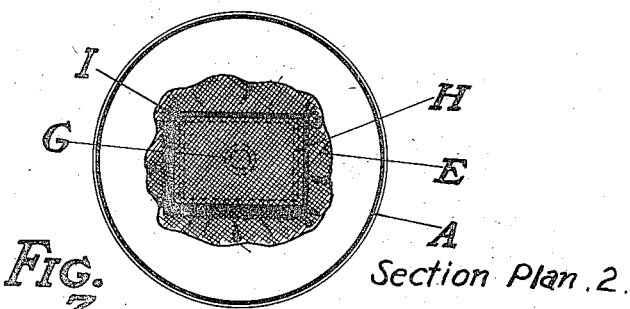
FIG. 3. Section Plan 2.
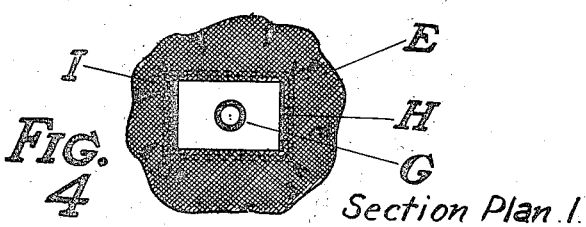
FIG. 4. Section Plan 1.
Inventor
James William Walker

UNITED STATES PATENT OFFICE.

JAMES WILLIAM WALKER, OF NEW YORK, N. Y., ASSIGNOR OF ONE-HALF TO GEORGE LEWIS HOGAN, OF NEW YORK, N. Y.

APPARATUS FOR MIXING OR IMPREGNATING ONE LIQUID WITH ANOTHER.

1,296,241.

Specification of Letters Patent.

Patented Mar. 4, 1919.

Application filed July 30, 1918. Serial No. 247,468.

*To all whom it may concern:*

Be it known that I, JAMES WILLIAM WALKER, a citizen of the United States, residing at the Ansonia Hotel, Broadway, New York, have invented a new and useful improvement in apparatus for mixing or impregnating one liquid with another resisting liquid, and particularly for impregnating hydrocarbon liquids, such as gasolene or kerosene, with water, rendering them more useful and efficient for use in vapor-generating apparatus and internal-combustion engines wherein the small quantity of water so administered will suffice to supply a source of oxygen compound for the purpose of reducing the carbon deposit usual in such apparatus.

The principle involved in my invention is the passing of the one resisting liquid through a porous material saturated with the other liquid, and means of continuing such saturation from a source of supply. I attain these objects substantially as illustrated in the accompanying drawings in which:

Figure 1 is a part sectional elevation, Fig. 2 is another part sectional elevation on a plan at right angles to that of Fig. 1. Fig. 3 is a transverse section on plane 2, and Fig. 4 is a transverse section on plane 1. Similar letters refer to similar parts throughout the several views.

The container (A) is preferably a metal tank open at its upper end (B), and provided with a hole (C) through the upper portion of its wall for the purpose of engaging a suspension hook (h). The lower end of the tank is provided with a bottom through the central portion of which is fitted a tube (G) open at both ends. A metal strap (H) is attached to the inner side of the bottom, and passes over the top of the tube (G), and is soldered or attached thereto for the purpose of bracing such tube, the upper end of such tube being preferably provided with one or more slots (F), for the purpose of affording ample outlet opening for the liquids so mixed. (E) is a covering of porous absorbent material, preferably of several thicknesses of cheese cloth stretched over and around the strap (H), so as to form a porous strainer wall over and around the upper end of the tube (G), and having its outer portion well against the bottom of the tank in such manner that no liquid can enter the tube (G) without passing through the cloth or equivalent (E). A wire band (I) is preferably used to secure the cloth (E) in position. (W) represents the lower or heavier liquid, which may be water, and (O) represents the upper or lighter resisting liquid, which may be kerosene, gasolene, or oil. (V) represents a valve fitted to the lower end of the tube (G).

The operation of my apparatus is as follows: The two resisting liquids to be mixed are poured into the container (A) in such quantities that the surface of the heavier liquid (W) shall not be above the opening in the upper portion of the tube (G). The lighter liquid will naturally float on the heavier liquid, and when the valve (V) is opened the upper liquid will be broken up by passing through the portion of the cloth above the lower liquid, and the lower liquid will saturate such cloth by capillary attraction, and the passing of the upper liquid in its finely divided state through such saturated cloth will absorb the heavier liquid in such cloth, and by this means it will be impregnated into the lighter liquid.

Whereas I have described this particular form of construction it is obvious that other forms of my invention may be constructed to suit the particular use to which it may be applied, and whereas in this particular apparatus I have shown a container for the liquids dependent upon gravity for flow. It is obvious that the liquid to be impregnated may be forced through the saturated fibrous or porous material by means of a pump or other external pressure as I make no claims as to the means of moving the liquid.

Having thus described my invention, I claim:

1. An apparatus for impregnating or mixing one liquid with another, consisting of a porous material saturated with the one liquid, and means for passing the other liquid through such saturated material as and for the purpose described.

2. An apparatus for impregnating or mixing one liquid with another, comprising a container for holding the two liquids one above the other, and provided with an outlet within the one liquid, and above the other liquid, and a porous wick inclosing or covering such outlet in the one liquid, and extending into the other liquid as and for the purpose described.

3. An apparatus for impregnating or mixing one liquid with another resisting liquid, comprising a container for holding the two liquids in stratified position one above the other, and provided with an outlet tube in its lower portion, the upper end of such tube extending into the upper liquid. A porous wick inclosing or covering the upper end of such tube, and extending downward into the lower liquid, substantially as and for the purpose described.

4. An apparatus for impregnating or mixing one liquid with another resisting liquid, comprising a container for the two liquids in stratified position, such container being open at its upper end, and provided with a bottom on the other end, and an outlet tube extending at its upper or inner end, above the level of the lower liquid, and its outer or lower end being provided to engage a valve or equivalent, a fibrous absorbent material, covering over the opening in the upper portion of such tube, and extending within the lower liquid substantially as and for the purpose described.

JAMES WILLIAM WALKER.

Witnesses:
Wm. J. Miller,
Elizabeth Whittendale.